April 7, 1953

F. H. HIGGINS ET AL 2,634,054

TIME AND WAGE CALCULATOR

Filed Jan. 24 1952

2 SHEETS—SHEET 1

INVENTORS:
W V. Young, &
Fred H. Higgins,

BY Cushman, Darby & Cushman

ATTORNEYS.

TIME AND WAGE CALCULATOR

Filed Jan. 24 1952

2 SHEETS—SHEET 2

INVENTORS:
W V. Young, &
Fred H. Higgins,
BY Cushman, Darby & Cushman
ATTORNEYS.

Patented Apr. 7, 1953

2,634,054

UNITED STATES PATENT OFFICE 2,634,054

TIME AND WAGE CALCULATOR

Fred H. Higgins and Waldemar V. Young, Casper, Wyo.

Application January 24, 1952, Serial No. 267,996

2 Claims. (Cl. 235—70)

This invention relates to a calculating device for computing the time and wages of employees on a daily basis.

In developing a practical method for computing elapsed time, an individual must perform five mental steps. These steps are: (1) determine the starting time; (2) determine the ending time; (3) compute the whole hours that have elapsed; (4) compute the residual minutes that have elapsed, and (5) convert the residual minutes to the required fraction or the next required whole fraction. Any practical device, must, therefore, replace these five mental steps substituting in their stead a very minimum of mental and mechanical effort.

It is, therefore, the principal object of the present invention to provide a computing device for determining elapsed time including the cost thereof based on a prevailing wage scale wherein the above outlined steps are performed with the very minimum of mental effort and mechanical manipulations.

A further object is to provide a computing device of the class described wherein the operator is enabled to permanently fix the "in time" while the "out time" is being located, wherein it is not necessary for the operator to hold both the in and out times in his head at the same time in order to manipulate the device.

A further object is to provide scales divided off into segments with suitable indicia disposed in the segments so that the operator need only match segments instead of lines or indicia.

A still further object of the present invention is to render such a device of relatively short length, but which can be used to handle all possible computations in connection with a twenty-four hour working day, and which may be constructed in the form of a flat longitudinal device suitable for carrying in the pocket or in a triangular form which can be operated with one hand from the surface of a desk or table.

According to the present invention, a computing device is provided which computes the elapsed time and the total cost thereof with the cost scale being so constructed as to permit the insertion and removal of different scales for the different wage rates.

Figure 1:
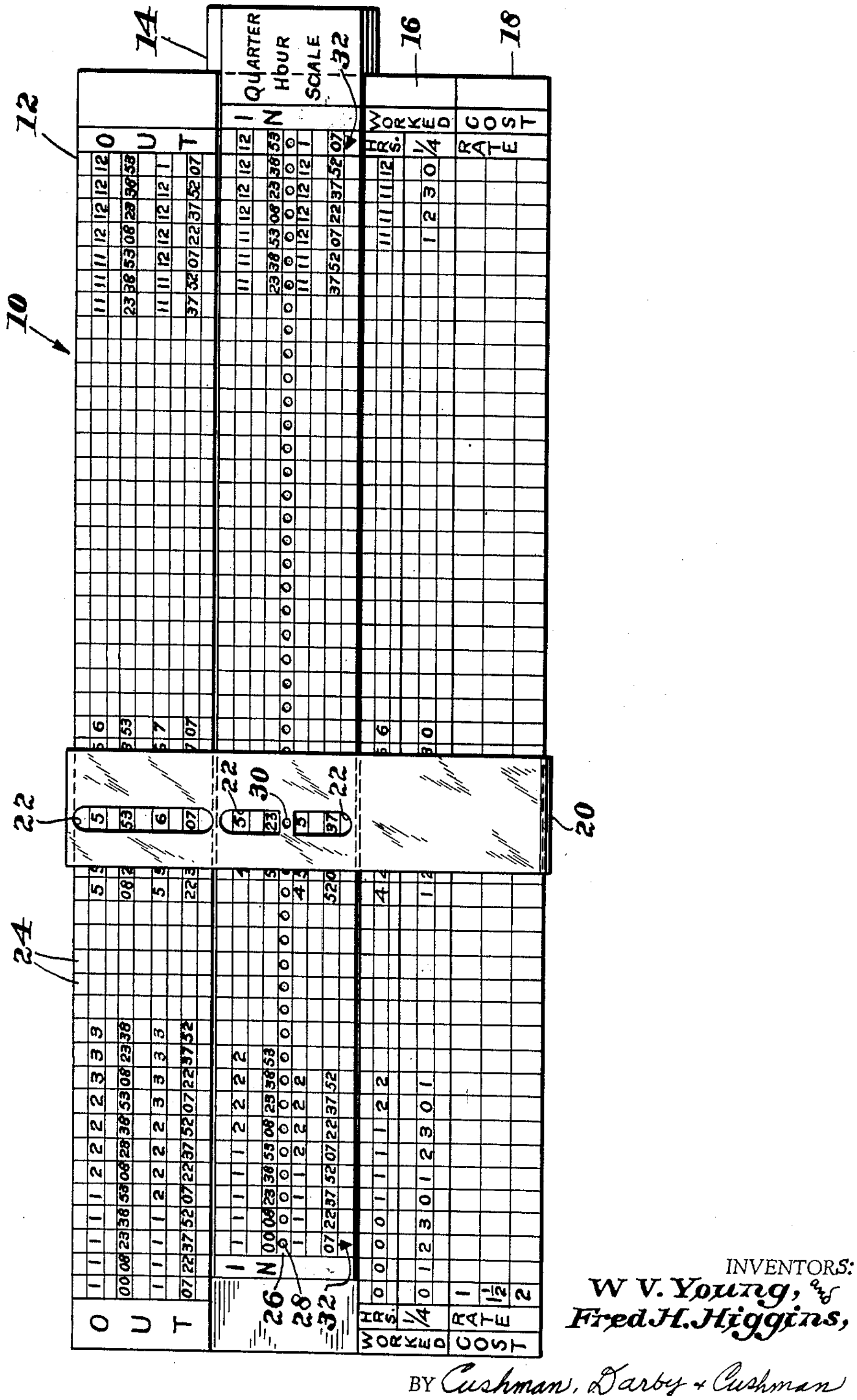
Figure 1 is a side elevation of one of the faces of the calculator of the present invention.

Referring now in more detail to the drawings, 10 generally designates a body member which is comprised of a fixed time out scale 12 and a slidable time in scale 14 and a fixed hours worked scale 16 and a cost scale 18.

Extending transversely across the scales 12, 14, 16 and 18 is a suitable guide member 20 which is mounted for sliding movement longitudinally of the scales. The guide member 20 is shown as having two longitudinal openings 22 on its face. The openings 22 are the same width as the segments 24 on the scales. Therefore, only one vertical row of indicia can be seen through the openings 22 through guide member 20. If desired, the openings 22 may be consolidated so as to provide one continuous opening in the guide member 20.

The time in scale 14 is provided with a central longitudinal row of segments 26 substantially medially thereof which are perforated with small holes 28 to receive a pencil point or other similar sized instrument. Guide member 20 is provided with a similar perforation 30 which is positioned to match the perforation 28 as the guide member 20 is moved longitudinally of the scales.

It will be observed that the time in and time out scales have suitable indicia disposed in the segments corresponding to the hours one through twelve, with the fractional parts of an hour being represented by minute parts thereof.

Figure 2:
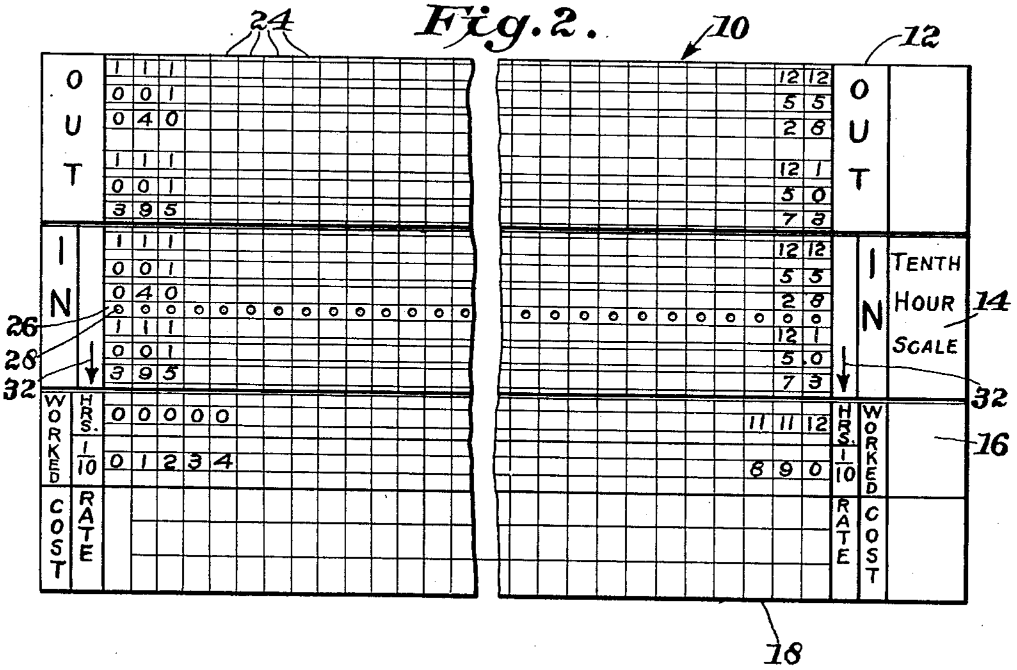
Figure 2 is a side elevation similar to Figure 1, but in broken segments showing another face with the hours worked or elapsed time scale set up so as to compute to the nearest one-tenth hour.

The hours worked scale also has indicia disposed in its segments corresponding to the whole hours, one through twelve, with the fractional parts of the hours being determined on one face in quarters, as shown in Figure 1, and in tenths, as shown in Figure 2. The present invention also envisions an additional face with an hours worked scale wherein the fractional parts of an hour are divided into twelfths, since these three fractions are the most commonly used ones in computing elapsed time in modern industrial plants.

The cost scale is designed to indicate the cost of the lapsed time for straight time, time and one half and double time, since in most industrial establishments the nature of the hours worked, i. e. whether it is straight, time and one half or double time will be generally known to the computer beforehand. The cost scale is shown in the drawings in blank, since it is desirable to insert individual cost scales depending upon the prevailing wage where the device is to be used.

Figure 3:
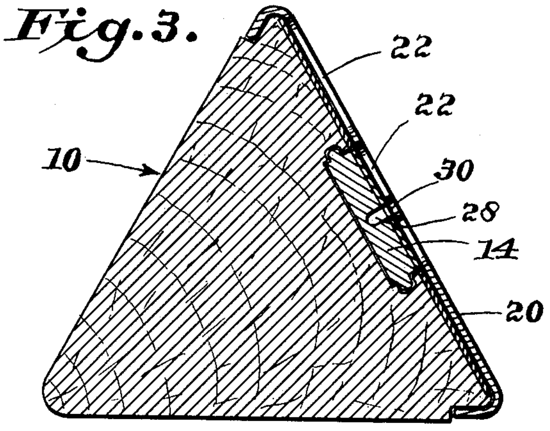
Figure 3 is a cross section of the calculating device constructed in its preferred triangular form.

The device as shown in Figure 3 represents its preferred form, since it has been found that a prismatic triangular form is most adaptable for use in that it can be placed on a flat surface and operated with one hand, while the face of the device will appear at the most convenient angle for operation.

The manner of using the device is as follows: The segment on the time in scale having indicia representing the starting time to the nearest minute at which the employee clocked in is set up by moving the guide member 20 until the proper segment appears in the opening 22. The point of a pencil, paper clip or other such instrument is inserted in the perforation 30 in guide 20 and into the corresponding opening 28 in the time in scale 14, and the guide 20 and time in scale 14 are moved together until the segment on the time out scale appears in the opening 22 having indicia representing the clocking out time of the employee. At this point, one of the arrows 32 at each end of the time in scale, depending on the position of the time in scale, will indicate the elapsed time to the nearest one-fourth, one-tenth or one-twelfth of an hour, depending upon the scale being used. If suitable cost indicia have been written into the blank segments of the cost scale, or if a suitable scale has been inserted, the vertical segment, contiguous with the hours worked segment, will indicate the wages earned by the employee based on straight time, time and one half or double time, as appropriate.

It will be observed that by this arrangement the operator of the device can permanently fix the in time and then forget about it, and then locate the out time on the time out scale. Therefore, it is not necessary for the operator to hold both the ending and beginning times in his head at the same time in order to manipulate the device. Also, the device of the present invention need cover but twelve hours in order to handle all possible computations, which materially reduces the size of the computer, which was a serious drawback in connection with similar devices previously employed.

The present device also contemplates matching segment to segment instead of line to line or point to point as was previously the case, and, therefore, if all the lines on the scales were to become completely obliterated, it could still be used. The time in and time out scales are clearly inclusive of a fractional part of an hour, or, stated otherwise, a consecutive number of minutes, which makes the task of locating the proper segment to be matched for either the in or out time much easier. Also, since many hourly rates are employed by different companies, the present invention provides for the insertion of each company's rate scales with which the device is to be used.

While the present invention has been described as having a slidable time in scale and a fixed time out scale, hours worked and cost scale, it is to be understood that the novel features of the present invention may be employed wherein the positions of the scales are changed. For instance, it is possible to arrange the four scales as shown in the drawings so that the cost scale would appear at the top rather than at the bottom, in which event the sequence would be from top to bottom, cost scale, hours worked scale, and time in and time out scale, in which case it would be necessary to reverse the direction of the arrows 32 on the time in scale. It is, therefore, to be understood that the invention is capable of other embodiments.

We claim:

1. A time and wage calculator comprising a base member having a time out scale affixed thereto representing consecutive periods of time and divided into units of equal size and value; a movable member slidably attached to said base and having a time in scale identical to said time out scale, a series of perforations on each of said units of said scale, and an indicating arrow on each end of said scale; an hours worked scale affixed to said base representing total time worked and divided into units of equal size representing an arithmetic progression of a given fraction of an hour, said units corresponding in size and number to the units on said time out scale; a cost scale affixed to said base representing total wages earned for any increment of time worked, and divided into units of size and number equal to the units on said time out scale; a cursor extending transversely across all of said scales provided with a plurality of openings through which appear the indicia on said time in and time out scales, and a small hole in said cursor in addition to said other openings, said small hole being alignable with the perforations in said time in scale; said time in scale being so alignable with said time out scale, hours worked and cost scales that when both the correct time in and time out are showing through said openings in said cursor said arrow on said time in scale points to the correct hours worked and wages earned on said hours worked and cost scales, respectively.

2. A time and wage calculator as described in claim 1 wherein said scales are parallel to the longitudinal axis of said base; the indicia on said scales being arranged in parallel horizontal and vertical segmental rows, and said base being of triangular cross section so as to facilitate operation of said calculator with one hand while said calculator rests on some suitable surface within reach of the operator.

FRED H. HIGGINS.
W. V. YOUNG.

REFERENCES CITED

The following references are of record in the file of this patent:

UNITED STATES PATENTS

| Number | Name | Date |
|---|---|---|
| 292,658 | Kiser | Jan. 29, 1884 |
| 603,695 | Keuffel | May 10, 1898 |
| 824,532 | Dunn | June 26, 1906 |
| 944,218 | Sommer | Dec. 21, 1909 |
| 1,461,975 | Eaton et al. | July 17, 1923 |
| 1,526,472 | Gardner | Feb. 17, 1925 |